Sept. 13, 1938.     G. A. DOUGHERTY     2,129,656
AXLE SPRING PAD
Filed Feb. 19, 1936     2 Sheets-Sheet 1

Inventor
Gerald A. Dougherty

By     W E Sherwood
Attorney

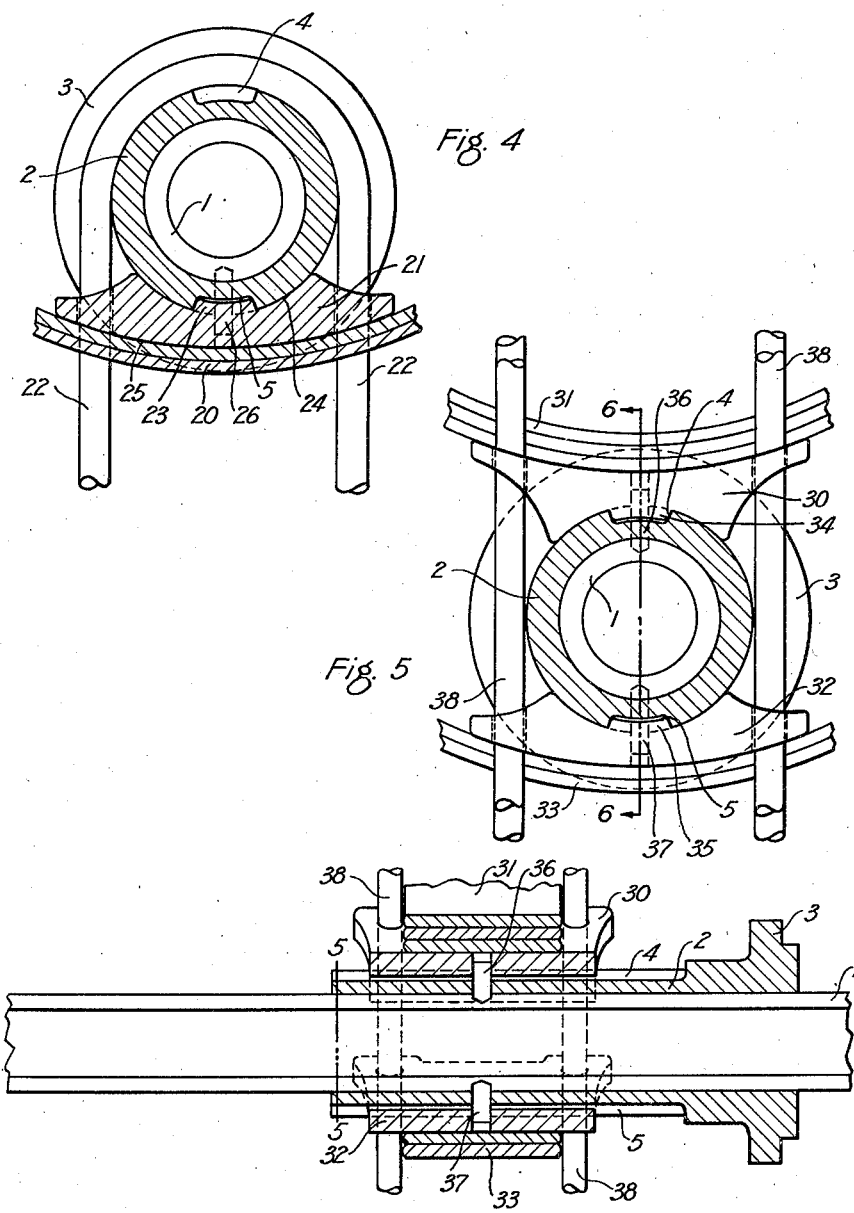

Patented Sept. 13, 1938

2,129,656

UNITED STATES PATENT OFFICE 2,129,656

AXLE SPRING PAD

Gerald A. Dougherty, Louisville, Ky., assignor to Shuler Axle Company, Inc., Louisville, Ky., a corporation of Delaware Application February 19, 1936, Serial No. 64,728

8 Claims. (Cl. 267—52)

This invention relates to the art of mounting springs upon axles of movable vehicles and more particularly to an improved construction of axle spring pad. While the invention is well adapted for axle constructions of the type applied to trailers of motor vehicles it will become apparent as the description proceeds that the invention is in no way limited to this particular usage, but on the contrary is equally well adapted to any construction wherein an axle and a spring supported body are employed.

Heretofore, various difficulties have accompanied the mounting of springs upon axles of vehicles and many attempts have been made to eliminate these disadvantages. Since the load carrying spring assumes a varying curvature due to road shocks and loading stresses and since braking torques on the axle exert stresses tending to change the relative positions of axle and springs, various expedients to minimize the effects of these factors have been sought.

Different types of spring pads and fastenings have been developed to serve this purpose, but these in turn have given rise to further problems involving the question of adequate bearing surfaces on the pads to prevent breakage of springs or pads; the problem of holding the pads against relative movement both longitudinally and transversely of the axle and the problem of locating such pads at the proper place on the axle to accommodate the spacing of springs on many different types of vehicles.

The present invention, therefore, is directed toward the solution of these various obstacles and has as an object the provision of a spring pad which is readily adjustable longitudinally on a standard type axle assembly during the manufacture of the same;

A second object is the provision of a spring pad which interlocks with the axle assembly preventing relative turning movement therewith;

Another object is the provision of a strong spring pad having large bearing surfaces for the axle assembly and the load carrying spring;

Another object is the provision of a spring pad which may be easily assembled on an axle and securely held in position with a minimum of fastening means;

Another object is the provision of a spring pad equally well adapted for mounting springs above or below the axle or for a combination of such mountings.

Other objects and advantages of the invention will become apparent as the description proceeds when considered in view of the accompanying drawings in which—

Figure 4 is a partial sectional view showing the invention as adapted for another form of spring mounting;

Figure 5 is a partial sectional view taken on line 5—5 of Figure 6 illustrating a further modification and Figure 6 is a partial sectional view taken on line 6—6 of Figure 5.

Figure 1:
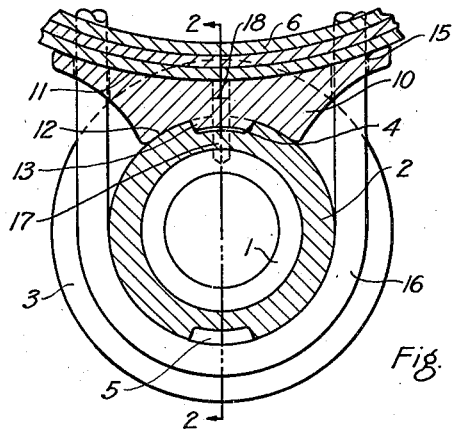
Figure 1 is a partial sectional view taken on line 1—1 of Figure 2 and showing the invention as adapted for one form of spring mounting.

As indicated in Figure 1, an axle 1, which may be of the tubular type, has secured thereto a brake support member comprising a hollow sleeve element 2 and an upstanding collar member 3 with which any conventional brake drum construction on the vehicle wheel may cooperate. The brake support member is preferably forced on the axle 1 by means of a high pressure to form an integral part of the axle, although it will be apparent to those skilled in the art that other means of fastening the brake support member to the axle may be employed. For example, the same could be shrunk on the axle by heat treatment, or could be welded thereon, or could be made integral with the axle and machined to proper dimensions without departing from the scope of this invention.

Figure 3:
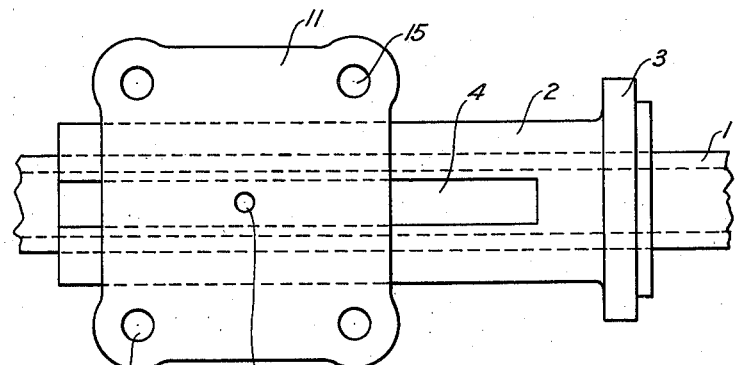
Figure 3 is a plan view of the construction shown in Figure 2 with the springs removed.

Machined, cast or forged into the upper and lower sides of the sleeve 2 are two slots 4 and 5 extending longitudinally of said sleeve. As best shown in Figure 3, these slots have a substantial width and depth and form a secure anchoring means for the adjustable spring pads later to be described.

Adapted to rest upon the axle assembly thus disclosed is a load bearing spring shown diagrammatically at 6 and comprising a series of spring leaves formed with the usual curvature. Interposed between spring 6 and the axle assembly is a spring pad 10 having an outer surface 11 formed to fit the curvature of spring 6 and having an inner surface 12 formed to fit the curvature of the sleeve element 2 on axle 1. Extending from the inner surface of the pad 10 and formed integrally therewith is a substantial spline 13 formed to fit into the slot 4 on the sleeve 2.

Spline 13 engages with a close fit into slot 4, and this construction thus prevents any relative turning movement between the spring pad and axle assembly, such as would be likely to occur otherwise during the normal usage of a vehicle owing to road shocks, braking stresses and the like.

Formed in spring pad 10 is a series of holes 15 through which may be passed any conventional type of fastening means such as a U-bolt 16. Due to the construction of the spring pad 10 with surfaces conforming to the spring and axle surfaces, a maximum of bearing surface for said spring and axle is obtained. The resulting spring pad is consequently strong and contains sufficient material to form an arch construction to bear the loading stresses. Owing to this fact, the U-bolt is passed through the spring pad as shown, instead of around it, as is the case in certain prior constructions, and is thus enabled to contact substantially all of the lower half of the axle assembly and to secure a close fit therewith.

Figure 2:
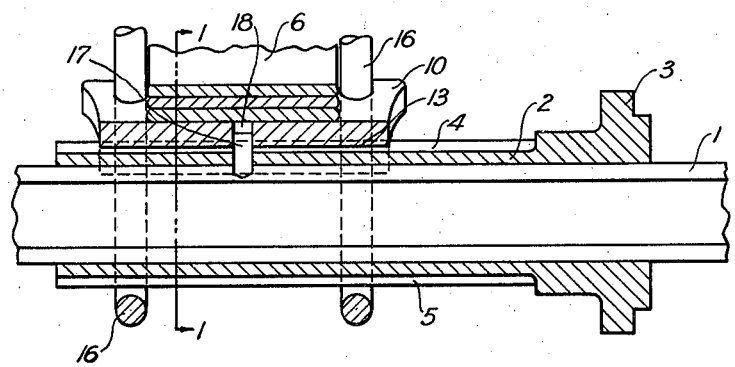
Figure 2 is a partial sectional view taken on line 2—2 of Figure 1.

Although the spring pad is held against relative turning movement with the axle by means of spline 13 on slot 4 and is held against longitudinal movement on the axle by means of U-bolts 16, it is found to be desirable to provide an additional securing means to hold such pad in its proper position. As shown in Figures 1 and 2 a suitable means such as dowel pin 17 is inserted into holes bored through the spring pad 10 and into sleeve 2 and axle 1. This pin is preferably of such size as to leave a space 18 above the top of the pin whereby the conventional centering bolt (not shown) of the spring may be inserted to assure proper assembly of the respective elements. Moreover, pin 17 will provide an additional security against longitudinal creeping of the spring pad with respect to the axle in the event that the fastening means 16 should become loosened through vibration or breakage.

In Figure 4 is shown an alternative construction adapted for use with an underslung spring suspension. In this arrangement a spring 20, shown diagrammatically, is held in position against spring pad 21 by means of a fastening means 22. Spring pad 21 has a substantial spline 23 formed on its inner surface 24 and fixed in slot 5 on sleeve 2. The inner surface 24 of the pad is formed to fit the curvature of sleeve 2 and the outer surface 25 is formed to fit the curvature of spring 20. A means such as pin 26 is provided for centering the spring pad and for holding the pad against longitudinal movement. As will be apparent, the advantages outlined with respect to the overhead spring suspension shown in Figure 1 will also be found in this modified construction.

In order to provide for those constructions in which both an overhead and underslung spring suspension are employed, the invention may be modified as shown in Figures 5 and 6. In this construction an upper spring pad 30 is interposed between upper spring 31 and sleeve 2 while a lower spring pad 32 is interposed between lower spring 33 and sleeve 2. The upper pad 30 has surfaces formed to fit the curvature of the upper spring and sleeve and has a spline 34 fixed in slot 4. Similarly, the lower pad 32 has surfaces formed to fit the curvature of the lower spring and sleeve and has a spline 35 fixed in slot 5. Dowel pins 36 and 37 assure the proper centering of the pads and springs and prevent unwarranted longitudinal movement of the same. Any suitable fastening means such as bolts 38 with appropriate securing members (not shown) may be used to secure the respective elements in place. By means of this dual construction road stresses resulting from operation of the vehicle are simultaneously transmitted from axle 1 to both of springs 31 and 33. Through the intermediary connecting means 38 the two sets of springs and the two spring pads 30 and 32 cooperate to take up shock and if excessive strain should suddenly be placed upon either of the sets of springs, such strain would be transmitted through the connecting means to the other set of springs and thus divide the load. Likewise, a shock originating from the body of the vehicle would be transmitted to the springs and be divided therebetween by means of their connection through connecting means 38.

In applying the invention to the manufacture of axles many advantages not enumerated heretofore will become apparent. As a result of this invention the manufacturer may use a standard type of axle and brake support assembly regardless of the particular vehicle on which it is to be used. When a customer orders axles for vehicles and specifies the spring spacing upon the same the manufacturer measures this spacing upon the standard axle and bores the holes for the dowel pins. The axle assembly, spring pads, pins and fastening means are then sent to the customer and are easily assembled upon the chassis of the vehicle. The adjustable spring pads are moved along the longitudinal slots and centered by means of the dowel pins and the assembly is then completed by securing the fastening means in place. In this way the standard axle assembly may be used for different types of vehicles with different spacings and mountings of springs merely by locating the dowel pin holes for that particular vehicle. This advantage enables the manufacturer to lower inventories of axles maintained on hand and to save appreciable time in filling customers' orders.

As a result of the arch construction of the spring pads and the curved surfaces thereof a maximum of bearing surface is secured and breakage of springs and pads is minimized. At the same time any flexing of the load carrying springs is transmitted to a wide bearing surface instead of being concentrated at one point and the useful life of such spring is extended. Moreover, the use of fastening means which hug the axle assembly closely insures a more secure assembly of the various parts and eliminates vibration and the consequent loosening and reservicing of the apparatus.

Having thus disclosed the invention it will be apparent that various modifications in design and application of the same may be resorted to without departing from the scope of the invention.

I claim:

1. An axle assembly comprising a load bearing wheel axle member having a longitudinal slot formed therein and comprising in combination, a spring, a spring pad member interposed between the spring and the axle assembly and fitted into the slot whereby said member may be adjusted longitudinally of the axle and secured against relative turning movement with said axle, and means fastening the spring, pad member and axle assembly securely together.

2. An axle assembly comprising a load bearing wheel axle member having a longitudinal slot formed therein and comprising in combination, a spring, a spring pad member interposed between the spring and axle assembly and fitted into said slot whereby said member may be adjusted longitudinally of the axle and secured against relative turning movement with said axle, positioning means holding the spring pad member in a selected position in said longitudinal slot and means fastening the spring, spring pad and axle assembly securely together.

3. An axle assembly comprising a load bearing wheel axle member including a brake support member having a longitudinal slot formed therein and comprising in combination, a spring disposed beneath the axle assembly, a spring pad interposed between the spring and axle assembly and secured in longitudinally adjustable position in the slot on the brake support member, and means fastening the spring, spring pad and axle assembly securely together.

4. In combination, a load bearing wheel axle for a vehicle, a sleeve member secured to the axle and having a plurality of longitudinal slots therein, an upper spring adapted for connection to the vehicle, an upper spring pad interposed between the sleeve and the upper spring and secured against turning movement by engagement into a slot on said sleeve, a lower spring adapted for connection to the vehicle, a lower spring pad interposed between the sleeve and the lower spring and secured against turning movement by engagement into a second slot on said sleeve, and means connecting the springs and pads securely together about the sleeve whereby stress arising from operation of the vehicle may be transmitted to or from the axle and be divided between the upper and lower springs by means of the connecting means.

5. In combination, a load bearing wheel axle for a vehicle, a sleeve member secured to the axle and having a plurality of longitudinal slots therein providing for ease of assembly, an upper spring adapted for connection to the vehicle, an upper spring pad interposed between the sleeve and the upper spring and adjustably secured into a slot on said sleeve, means holding the pad in selected longitudinal position in said slot, a lower spring adapted for connection to the vehicle, a lower spring pad interposed between the sleeve and the lower spring and adjustably secured into a slot on said sleeve, means holding said pad in selected longitudinal position in said slot, and means connecting the springs and pads securely together about the sleeve whereby stress arising from operation of the vehicle may be transmitted to or from the axle and be divided between the upper and lower springs by means of the connecting means.

6. In an axle assembly having a brake support member secured to a load bearing wheel axle with a longitudinal slot formed within said support member, a spring pad member mounted adjacent the axle and secured into said slot for adjustment longitudinally of the brake support member during assembly of the structure, a curved spring contacting the outer surface of the pad member, said pad member having an outer surface formed to fit the curvature of said spring and means fastening the spring, pad and axle assembly together.

7. In an axle assembly having a brake support member secured to a load bearing wheel axle with a longitudinal slot formed within said support member, a spring disposed above the axle assembly, a spring pad member interposed between the spring and axle assembly and adjustably secured into said slot longitudinally of the axle whereby relative turning movement between the pad member and axle assembly is prevented and means fastening the spring, pad member and axle assembly securely together.

8. In combination with a load bearing wheel axle including a brake support member having a longitudinal slot formed therein, a spring, a strong spring pad of arch construction adapted to be interposed between the brake support member and the spring and having an inner surface formed to fit the brake support member and adjustable longitudinally of the axle during assembly of the structure, means securing the spring pad in the slot of the brake support member whereby relative turning movement therewith is prevented, said spring pad having an outer surface formed to fit said spring and providing a large bearing surface therefor, holes arranged through said spring pad and fastening means for the spring, spring pad and axle insertable through said holes and adapted to bear in close contact against the side of the axle opposite to the spring pad.

GERALD A. DOUGHERTY.